June 11, 1968 R. G. CHUY ET AL 3,387,390
FLASH CARD GAME AND STAND
Filed Sept. 12, 1966 3 Sheets-Sheet 1
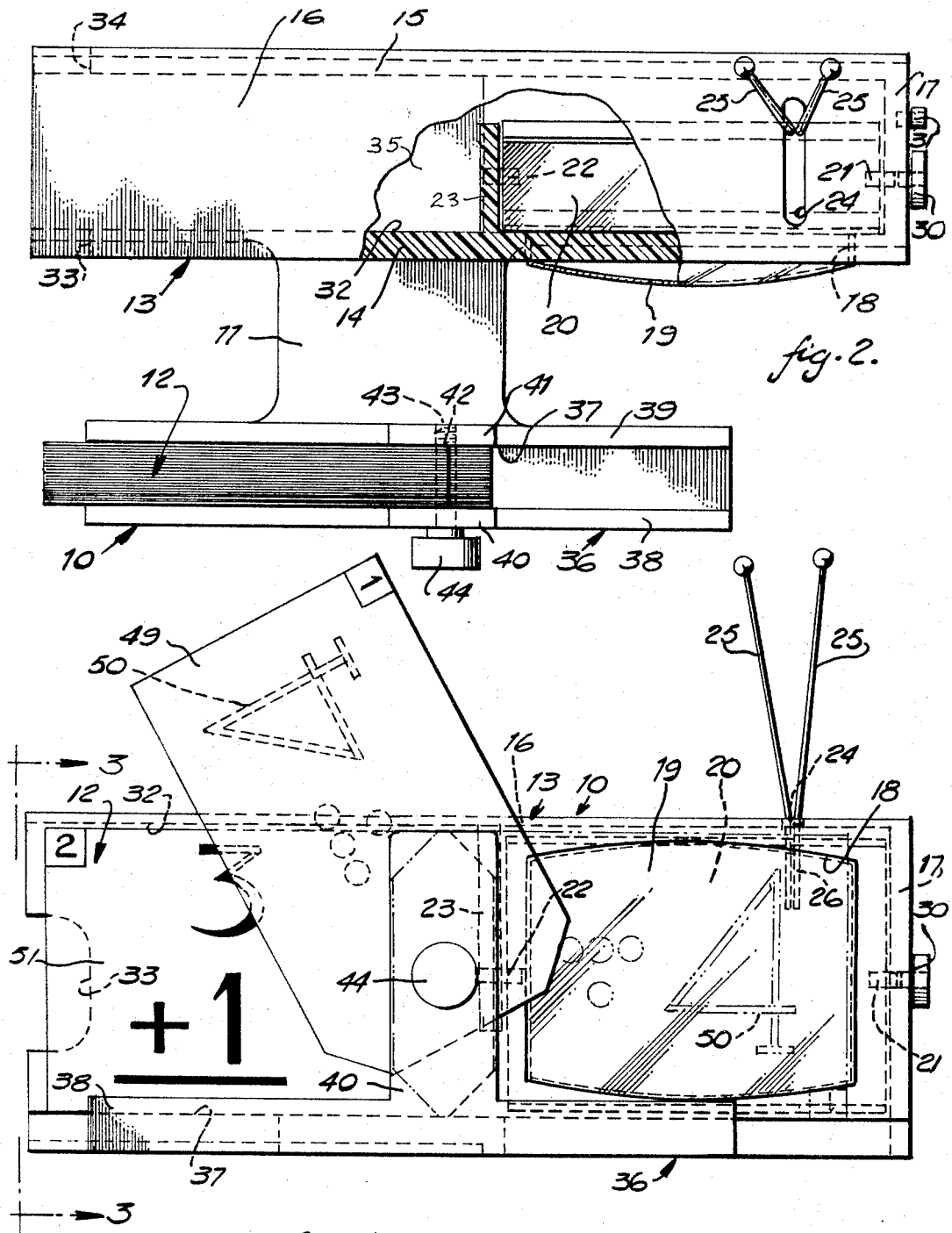
INVENTORS.
RUTH G. CHUY
BY DANIEL T. CHUY
Donnelly, Mentag & Harrington
ATTORNEYS

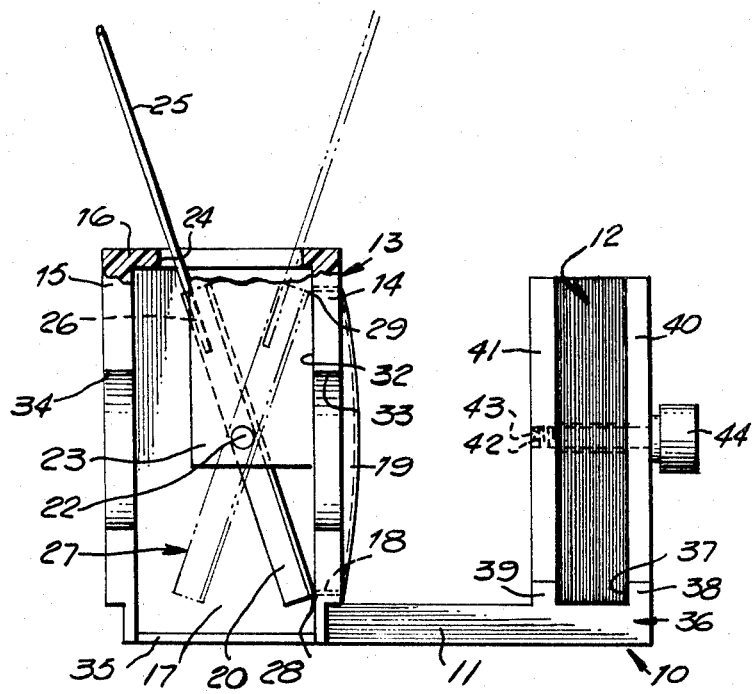
fig. 3.
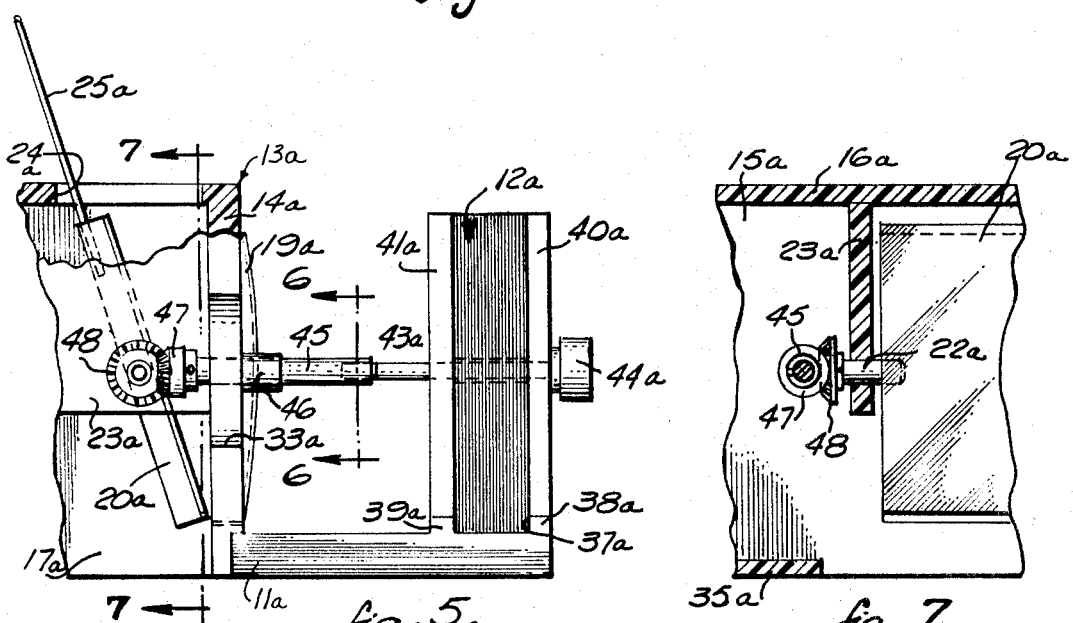
fig. 5.
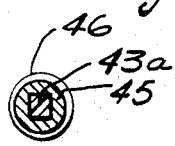
fig. 6.
fig. 7.
INVENTORS.
RUTH G. CHUY
DANIEL T. CHUY
BY Donnelly, Mentag & Harrington
ATTORNEYS June 11, 1968  R. G. CHUY ET AL  3,387,390
FLASH CARD GAME AND STAND Filed Sept. 12, 1966  3 Sheets-Sheet 3

INVENTORS.
RUTH G. CHUY
DANIEL T. CHUY
BY Donnelly, Mentag & Harrington
ATTORNEYS

United States Patent Office 3,387,390
Patented June 11, 1968

3,387,390
FLASH CARD GAME AND STAND
Ruth G. Chuy and Daniel T. Chuy, both of
15447 Sorrento, Detroit, Mich. 48227
Filed Sept. 12, 1966, Ser. No. 578,778
9 Claims. (Cl. 35—31)

This invention relates generally to flash card games used by children for learning simple arithmetic problems, and more particularly, to an improved flash card game device having a flash card viewing mirror disposed within a simulated television set.

In the prior art flash card game devices each flash card has a problem on the front face and the answer thereto on the back face so that as a card is raised to move it in front of the viewing mirror, the next problem is exposed but the answer in the mirror belongs to the first problem on the raised card, and the child using the device is confused as to which problem belongs to the answer in the mirror. Another disadvantage of the prior art flash card game devices is that the plain structures employed to hold the viewing mirror and flash cards do not aid in the problem of getting the child interested in using the device and in maintaining his interest in the same.

In view of the foregoing, it is an important object of this invention to provide a flash card game device which overcomes the aforementioned disadvantages of the prior art flash card game devices.

It is another object of the present invention to provide a flash card game device having an adjustable viewing mirror encased in a simulated television housing to add interest in the use of the device by a child, and wherein said mirror comprises the television screen upon which appears the answers to problems or questions carried on flash cards moved in front of the mirror. The simulated television housing includes antennae-like members for adjusting the mirror from one position for viewing an answer therein to another position so that the answer cannot be viewed.

It is still another object of the present invention to provide a flash card game device provided with flash cards on which the answer to a problem or question on one flash card appears on the back face of the succeeding flash card in a set of such cards, whereby as each flash card is rotated from a set of such cards to a position before a viewing mirror the next problem is exposed, and the answer to said next problem appears on the back face of the card rotated in front of the mirror.

It is a further object of the present invention to provide a flash card game device having flash cards arranged and constructed so that only one problem, and the answer thereto, appears to the user of the device at any time, thereby eliminating confusion in the mind of the user as to what problem the answer refers to.

It is still a further object of the present invention to provide a flash card game device embodying a simulated television set, and wherein the channels on the simulated television set are designated by the mathematical symbols of $+$, $-$, $\times$, and $\div$, which are the symbols for addition, subtraction, multiplication, and division, and the simulated television set is provided with a rotating knob having an indicating means to indicate which program, mathematically speaking, will take place next, in play fashion.

It is still another object of the present invention to provide a flash card game device embodying a simulated television set provided with an adjustable flash card viewing mirror which may be adjusted to be manipulated from the front of the television set by means also adapted for securing a set of flash cards in a stand on the front side of the simulated television set.

Other objects, features and advantages of this invention will be apparent from the following detailed description, appended claim, and the accompanying drawings.

In the drawings:

FIG. 1 is a front elevational view of a flash card game device made in accordance with the principles of the present invention, and showing a flash card being rotated into position in front of a mirror in a toy television set;

FIG. 2 is a top plan view, with parts broken away, of the flash card game device illustrated in FIG. 1;

FIG. 3 is a left side elevational view, with parts broken away, of the structure illustrated in FIG. 1, taken along the line 3—3 thereof, and looking in the direction of the arrows;

FIG. 5 is a fragmentary, left side elevational view, with parts in section of a modified embodiment of the invention;

FIG. 6 is an elevational section view of the structure illustrated in FIG. 5, taken along the line 6—6 thereof, and looking in the direction of the arrows; and, FIG. 7 is a fragmentary, elevational section view of the structure illustrated in FIG. 5, taken along the line 7—7 thereof, and looking in the direction of the arrows.

Figure 4:
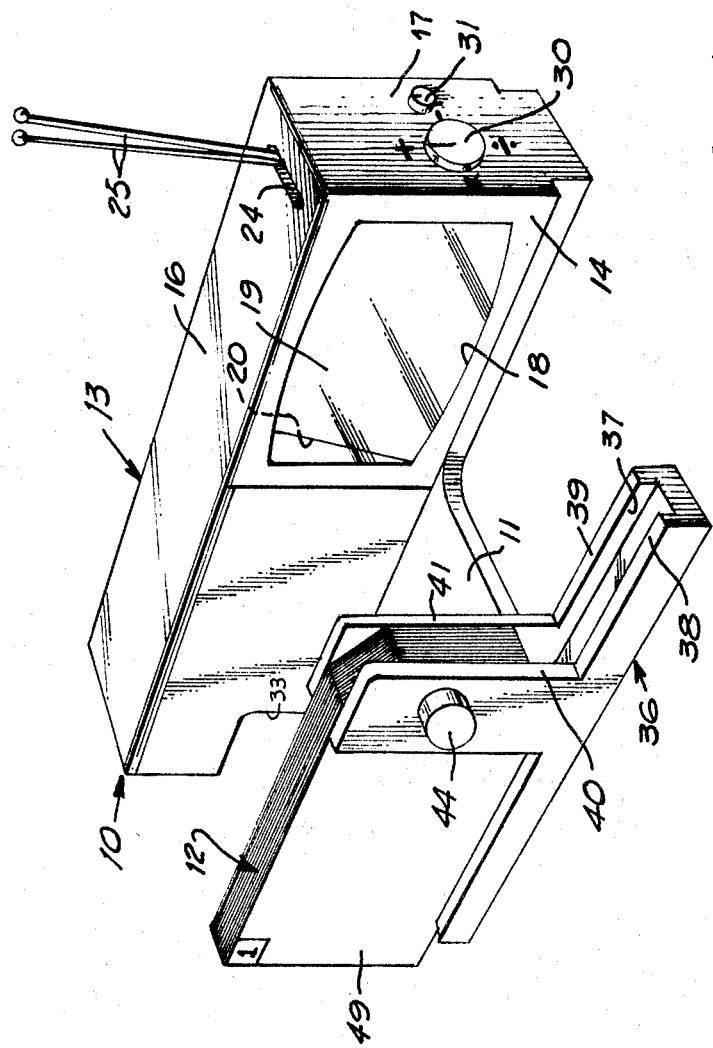
FIG. 4 is a perspective view of the flash card game device illustrated in FIGS. 1 through 3.

Referring now to the drawings, and in particular to FIGS. 2, 3 and 4, wherein like reference characters designate like or similar parts, the numeral 10 generally designates a flash card game device which includes a base or platform 11, a set of flash cards 12, and a housing 13 having the general outward appearance or configuration of a television set. The set of cards 12 is mounted on the front end of the platform 11 and the housing 13 is mounted on the rear end of the platform 11.

As best seen in FIG. 2, the housing 13 includes a front wall 14 and a laterally spaced apart rear wall 15. The housing 13 is enclosed on the top side thereof with the integrally formed wall 16, and on the right side thereof with the integrally formed wall 17. A shown in FIGS. 1 and 4, the housing front wall 14 is provided with an opening 18 which simulates the shape of the opening in front of a television picture tube in a television set housing. The opening 18 is enclosed by any suitable transparent enclosure or covering 19, as for example, a transparent plastic cover to provide the appearance of a television set window. The opening 18 is substantially rectangular in shape.

As shown in FIGS. 1, 2 and 3, a reflecting means or mirror is pivotally mounted between the front wall 14 and the rear wall 15. The mirror 20 is substantially rectangular in shape and is slightly larger than the opening 18 in the housing wall 14. As best seen in FIG. 2, the right end of the mirror 20 is pivotally mounted on a pivot pin or journal 21 which is fixed in the right side wall 17. The left end of the mirror 20 is pivotally mounted on the pivot pin or journal 22 which is fixed in an intermediate wall 23. The wall 23 is disposed perpendicularly to the front wall 14 and extends inwardly therefrom. The wall 23 may be formed integral with the wall 14. The wall 23 is disposed at a point which is the intermediate or central point on the front wall 14.

As best seen in FIGS. 2 and 3, the housing 13 is provided with an elongated slot 24 which is formed through the top wall 16 on the right end of the housing 13. The slot is disposed perpendicularly to the front wall 14 and extended through this slot is a pair of diverging antennae 25 which simulates the antenna on a television set. As shown in FIGS. 1 and 3, the lower ends 26 on the antennae 25 are fixedly secured to the top of the mirror 20 by any suitable means. The slot 24 is disposed in a position parallel to the right side wall 17 and in a position spaced therefrom. One method of connecting the lower ends 26 of the antennae 25 to the mirror 20 is to press said ends into a suitable opening in the rectangular frame backing for the mirror and to secure the same in place, as by a press fit.

The mirror 20 is adapted to be pivoted or adjusted over an angular distance of approximately 20° forwardly and backwardly from the vertical axis. The mirror 20 is adapted to be moved from the solid line position shown in FIG. 3 to the broken line position 27 shown in FIG. 3, and vice versa, by means of the antennae 25. It will be seen that by pushing said antennae backwards or forwards, the mirror 20 will be rotated between the solid line operative position shown in FIG. 3, and the inoperative broken line position 27 of FIG. 3. The backward and forward rotation of the mirror 20 is stopped by the mirror hitting the inner upper and lower portions of the front wall 14, as indicated by the points 29 and 28, respectively.

As shown in FIG. 4, the housing 13 is provided on the right side thereof with a rotatable knob 30 which has an indicating line or groove on the outer face thereof that may be turned in any direction to designate the proper "channel." The "channels" are designated by the various mathematical signs as for example, the plus sign, the minus sign, the multiplication sign, and the division sign. The user of the flash card game device may thus "tune" in on the "channel" which corresponds to the set of flash cards being used on the front of the device. That is, if the flash cards contain problems in addition, then the knob 30 would be turned to the plus sign, and so forth. It will be understood, that other words or symbols could be used in lieu of the multiplication signs around the knob, as for example, words, pictures, quiz symbols, historical symbols, music symbols, and so forth, for other types of cards. As shown in FIG. 4, a second knob 31 may be provided on the right side of the housing 13 to simulate the "on" and "off" switch.

As shown in FIG. 2, the left end of the housing 13 is adapted for the storage of additional sets or decks of flash cards. The left end of the housing 13 is open and the right end of the card storage compartment 32 is formed by the intermediate wall 23. The front and rear walls of the housing 13 are provided with the finger openings or recesses 33 and 34, respectively. The card storage compartment 32 is enclosed on the lower side thereof by the bottom wall 35. As shown in FIG. 2, the bottom wall 35 does not extend beyond the intermediate wall 23. The housing 13 does not contain any wall under the mirror enclosing portion of the housing 13.

As best seen in FIGS. 2 and 4, the flash card game device of the present invention is provided with a flash card holding means generally indicated by the numeral 36. The flash card holding means 36 comprises an elongated block which is integrally formed on the front end of the platform 11 and which is provided on the upper or top side thereof with a longitudinally extended slot 37 that is bounded by the side walls 38 and 39. The set of flash cards 12 is adapted to be mounted in the slot 37 on the left end thereof and to be rotated into an operative position on the right end of the card holding means so that each card is successively disposed in front of the mirror 20.

The flash card device of the present invention is provided with a means for rotatably supporting the set of flash cards in the slot 37 and said means comprises a pair of spaced apart vertically extended plates 40 and 41 which are integral with the slot side walls 38 and 39. The upwardly extended plates 40 and 41 are disposed to the left of the mirror 20 as shown in FIG. 2. As shown in FIG. 2, the flash cards are each provided with a hole on the right end thereof through which is extended the pivot shaft 42 that has its inner end threadably mounted in the hole 43 formed in the vertical plate 41. The front end of the shaft 42 is provided with a finger knob 44 for turning the shaft 42 in the hole 43 to bring the plates 40 and 41 together to clamp the flash cards therebetween with any amount of holding pressure, as desired.

The flash card game device illustrated in FIGS. 1 through 4 may be constructed from any suitable material, as for example, from a molded plastic. The device may be molded in one unit with an open bottom or back to facilitate assembly of the mirror 20.

As shown in FIGS. 1 and 4, the first card in each set of flash cards would be blank on the front side thereof. The first card is indicated by the numeral 49 and on the reverse side of this card is the answer indicated by the numeral 50, for the problem which appears on the front side of the succeeding card, or number two card indicated by the numeral 51. The illustrative example shows that the problem on the front face of card number two is an addition problem and the answer would appear in the mirror 20 when the card 49 is swung in a clockwise direction from the left side of the stand to the right side in a position before the mirror 20. FIG. 1 shows the first card, or card 49, being swung from the position in front of the second card, namely card 51 and into an operative position before the mirror 20. It will be seen that the method of having the answer on the rear face of a first card and the problem on the succeeding, or following card, eliminates any confusion in the mind of the user since the only problem appearing to the user and the only answer appearing to the user in the mirror are to be used with each other. This construction eliminates any confusion in the mind of the user as is present in some prior art flash cards wherein the succeeding problem is visible to the user when the flash card is swung before the reflecting mirror. The cards in the sets of cards 12 are numbered in consecutive order so that they can be quickly and easily put in proper order again if they should be mixed up.

It will be understood that the mirror 20 may be rotated to the inoperative dotted line position 27 by the user when the flash game is not in use. It will also be understood that the user can move the mirror 20 between the first and second or inoperative and operative positions between each rotation of a card so that the card may be placed in the viewing position before the mirror 20 is moved into the reflecting position.

FIGS. 5, 6 and 7 illustrate a second embodiment of the invention in which the structure for rotating the mirror 20 has been slightly modified. The parts of the embodiment of FIGS. 5, 6 and 7 which are the same as the first described embodiment are marked with the same reference numerals followed by the small letter "a." As shown in FIG. 5, the flash card pivot shaft 43a is extended toward the housing 13a and is provided with a square end as shown in FIG. 6 for insertion into a mating square hole in the sleeve shaft 45. The sleeve shaft 45 is rotatably mounted in the bearing or journal 46 and it extends through the bearing 46 into the housing 13a. Fixedly mounted on the inner end of the sleeve shaft 45 is a first bevel gear 47 which is meshed with the second bevel gear 48. The second bevel gear 48 is fixed on the outer end of the mirror pivot shaft 22a. It will be seen that when the knob 44a is rotated, the mirror 20a will be rotated in either direction in accordance with the rotation of the knob 44a. The use of the structure illustrated in FIGS. 5, 6, and 7 permits the mirror 20a to be adjusted from the front of the set of flash cards. It will be understood that it is possible to use both the antennae 25 and the mirror adjustment structure of FIGS. 5, 6 and 7 together, leaving the choice of the adjustment in each case to the user. The embodiment of FIGS. 5, 6 and 7 operates in the same manner as the first described embodiment.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:
1. A device of the class described, comprising:
 (a) a housing;
 (b) a mirror mounted in said housing;
 (c) a set of flash cards mounted in spaced relation to said housing and movable individually into position in front of the mirror for viewing successively the rear face of each card; and,
 (d) each of said flash cards being provided with an answer on the rear face thereof corresponding to a problem on the front face of the succeeding card, with the first card of the set of cards having no problem on its front face and the last card of the set of cards having no answer on its rear face.
2. A device of the class described in claim 1, wherein:
 (a) said mirror is pivotally mounted in said housing and is movable between an inoperative position so that a flash card disposed in front of the mirror is unobservable, and an operative position where such a flash card is observable.
3. A device of the class described in claim 2, including:
 (a) means for moving said mirror between said operative and inoperative positions.
4. A device of the class described in claim 3, wherein said means for moving said mirror between said operative and inoperative positions comprises:
 (a) a simulated television antennae rod.
5. A device of the class described in claim 3, wherein said means for moving said mirror between said operative and inoperative positions comprises:
 (a) a manually operated gear drive means.
6. A device of the class described in claim 5, wherein:
 (a) said housing is shaped as a simulated television set.
7. A device of the class described in claim 6, wherein:
 (a) said simulated television set housing is provided with simulated television control knobs.
8. A device of the class described in claim 1, wherein:
 (a) said housing is provided with a storage compartment for a set of flash cards.
9. A device of the class described in claim 1, wherein:
 (a) said set of flash cards are pivotally mounted on one side of said mirror so as to be rotatable into position in front of said mirror.

References Cited

UNITED STATES PATENTS 1,589,005   6/1926   Bassett _____ 35—73 XR
1,736,552  11/1929   Shulman et al. _____ 35—9
3,339,296   9/1967   Chuy _____ 35—31

EUGENE R. CAPOZIO, *Primary Examiner.*

WILLIAM H. GRIEB, *Examiner.*